United States Patent [19]

Doss

[11] 4,101,484

[45] Jul. 18, 1978

[54] SEALANT BASED ON THERMOPLASTIC ELASTOMER AND MIXED MODIFYING RESINS

[75] Inventor: Richard C. Doss, Bartlesville, Okla.

[73] Assignee: Phillips Petroleum Company, Bartlesville, Okla.

[21] Appl. No.: 729,432

[22] Filed: Oct. 4, 1976

[51] Int. Cl.$^2$ .................... C08L 53/02; C08L 83/10; C08L 93/00
[52] U.S. Cl. ........................ 260/27 BB; 156/329; 156/334; 260/27 R;; 260/33.6 UA; 260/824 R; 260/827; 260/876 B; 260/879; 260/880 B
[58] Field of Search ............ 260/27 R, 27 BB, 876 R, 260/876 B, 879, 880 B, 824 R, 827, 33.6 UA; 156/329, 334

[56] References Cited

U.S. PATENT DOCUMENTS

| | | | |
|---|---|---|---|
| 3,325,430 | 6/1967 | Grasley | 260/25 |
| 3,427,269 | 2/1969 | Davis et al. | 260/27 R |
| 3,635,861 | 1/1972 | Russell | 260/27 R |
| 3,639,521 | 2/1972 | Hsieh | 260/880 B |
| 3,658,740 | 4/1972 | Marrs et al. | 260/880 B |
| 3,736,281 | 5/1973 | Russell | 260/27 R |
| 3,766,295 | 10/1973 | Crossland et al. | 260/27 BB |
| 3,784,587 | 1/1974 | Chambers | 260/880 B |
| 3,872,548 | 3/1975 | Bryant et al. | 260/880 B |
| 3,917,607 | 11/1975 | Crossland et al. | 260/880 B |
| 3,993,613 | 11/1976 | Doss et al. | 260/27 BB |

*Primary Examiner*—Ronald W. Griffin

[57] ABSTRACT

A sealant made up of (1) a block copolymer from at least one monovinyl-substituted aromatic compound and at least one conjugated diene, said block copolymer being a thermoplastic elastomer; (2) a poly(vinyl aromatic)-compatible component; and (3) a polydiene-compatible component; and (4) a filler.

8 Claims, No Drawings

SEALANT BASED ON THERMOPLASTIC ELASTOMER AND MIXED MODIFYING RESINS

BACKGROUND OF THE INVENTION

This invention relates to polymer sealant compositions.

It is known to use polymers in sealant compositions. However, the whole field of sealant compositions is one of compromising between competing desirable properties. That is, changing a formulation to give improved properties in one area results in deterioration of some other property. For instance, it is desired that the sealant be flexible, i.e., rubbery, so as not to become brittle after a period of years and to allow for normal expansion and contraction. Rubbery materials are obviously ideally suited in their inherent characteristics in this regard. However, because of the unsaturation in rubber, it tends to become brittle on aging. It is readily apparent that it is desirable that the sealant adhere reasonably well to the sides of the joint or crack to which it is applied, yet after the sealent is cured it is undesirable for it to have a tacky exposed surface. Finally, it is desired that the sealant, in instances where a solvent base is used, have a relatively low bulk viscosity so as to facilitate the application; however, the use of increased percentages of solvent to achieve this low viscosity results in undesirable shrinkage when the solvent evaporates, once again an example of having to accept a deterioration in one property in order to get an improvement in another.

SUMMARY OF THE INVENTION

It is an object of this invention to provide a sealant formulation having good flexibility and the ability to withstand weathering;

It is a further object of this invention to provide a sealant formulation which has good adhesion and yet which, on curing, is not tacky; and It is yet a further object of this invention to provide a sealant formulation having low bulk viscosity in solvent-based formulations yet exhibiting low shrinkage.

In accordance with this invention, there is provided a mixture of (1) thermoplastic elastomeric block copolymer of at least one monovinylsubstituted aromatic compound and at least one conjugated diene; (2) a poly(vinyl aromatic)-compatible component; (3) a polydiene-compatible component; and (4) a filler.

DESCRIPTION OF THE PREFERRED EMBODIMENTS

This invention pertains to a new sealant formulation based on a linear or radial teleblock copolymer of at least one conjugated diene and at least one monovinyl-substituted aromatic compound, said formulation containing a filler and a mixture of Resin A — at least one poly(vinyl aromatic)-campatible modifying resin — and Resin B — at least one polydiene-compatible modifying resin. Other possible ingredients in the inventive sealant formulations include plasticizer, pigment, solvent and stabilizers.

The inventive sealant formulations exhibit lower bulk viscosities than comparable formulations containing a single poly(vinyl aromatic)-compatible modifying resin and decreased surface tack and increased canvas peel strength (adhesion) compared to formulations containing a single polydiene-compatible modifying resin. The lower bulk viscosities allow more convenient application of the inventive sealant to the substrate. If the inventive sealant is applied as a hot melt, a lower application temperature is required; if applied as a solvent-release system, lower solvent level is needed thus resulting in lower subsequent shrinkage of the applied sealant, less void formation and mor economical application. The decreased surface tack of the inventive formulations is important from the standpoint that tacky sealants tend to accumulate debris, dirt, insects, etc. on the surface and thus become aesthetically unattractive.

Linear and radial teleblock copolymers of conjugated dienes and monovinyl-substituted aromatics useful in this invention are of structure ABA or $(AB)_nY$ wherein A represents a block of at least one poly(monovinyl aromatic), B represents a block of at least one poly(conjugated diene), Y represents a residue of a polyfunctional coupling agent or a polyfunctional initiator and n is an integer having a value of from 2 to 4. A and B generally represent pure homopolymer blocks, but it is also within the scope of this invention to include those block copolymers containing the well-known "tapered" blocks. These copolymers are sometimes referred to as thermoplastic elastomers or plastomers because they exhibit elastic properties in the solid state without chemical curing and thus can be repeatedly remelted. Mixtures of these theremoplastic elastomers can be used.

Monovinyl-substituted aromatic compound monomers useful in the preparation of the A blocks of the above-described copolymers generally contain from 8 to 12 carbon atoms per molecule. Examples of such monomers include styrene, 3-methylstyrene, 4-n-propylstyrene, 1-vinylnaphthalene, 2-vinylnaphthalene and the like. Styrene is preferred.

Useful conjugated dienes for the preparation of the B blocks of the above-described copolymers include those generally containing from 4 to 8 carbon atoms per molecule. Examples of such monomers include 1,3-butadiene, isoprene, 1,3-pentadiene, 2,4-hexadiene, 3-ethyl-1,3-pentadiene, and the like. 1,3-Butadiene and isoprene are preferred.

ABA block copolymers are prepared by methods well known in the art such as by the sequential addition of monomers to a system utilizing an organmonolithium initiator as described in U.S. Pat. No. 3,639,521, the disclosure of which is hereby incorporated by reference.

$(AB)_nY$ block copolymers are prepared using polyfunctional organolithium initiators or polyfunctional coupling agents by well-known methods such as are adequately described in U.S. Pat. Nos. 3,030,346, 3,251,905, 3,281,383 and 3,639,521, the disclosures of which are hereby incorporated by reference.

When Y is a residue of a polyfunctional coupling agent, it is derived from treating agents containing from 2 to 4 functional groups per molecule. Useful coupling agents include polyepoxides, polyimines, polyisocyanates, polyaldehydes, polyketones, polyesters, polyanhydrides and polyhalides. Specific examples of such agents include benzene-1,4-diisocyanate, naphthalene-1,2,5,7-tetraisocyanate, tri(1-aziridinyl)phosphine oxide, epoxidized soybean oil, epoxidized linseed oil, 1,4,7-naphthalene tricarboxaldehyde, 1,4,9,10-anthracenetetrone, pyromellitic dianhydride, trimethyl tricarballylate, dimethyldichlorosilane and silicon tetrachloride.

When Y is a residue of a polyfunctional initiator, it is derived from compounds of general formula $R(Li)_x$ where x is an integer of from 2 to 4 and R is an aliphatic, cycloaliphatic or aromatic radical containing from 1 to 20 carbon atoms. Specific examples of useful polyfunctional initiators include dilithiomethane, 1,4-dilithiobutane, 1,20-dilithioeicosane, 1,2-dilithio-1,2-diphenylethane, 1,4-dilithiocyclohexane, 1,3,5-trilithiopentane, 1,2,5-trilithionaphthalene, 1,3,5,8-tetralithiodecane and 1,2,3,5-tetralithiocyclohexane.

The A/B weight ratio in the above-described polymers will generally be in the range of 50/50 to 5/95 and preferably in the range 40/60 to 15/85. The block copolymers will generally be in the range of weight average molecular weights from 10,000 to 750,000 and preferably from 50,000 to 350,000. Thus, with at least half, preferably more than half diene content, the polymers are rubbery and contain unsaturation normally associated with such polymers.

Resin A or modifying resins which are compatible with the poly(vinyl aromatic) blocks of the linear or radial teleblock copolymers useful in this invention are aromatic hydrocarbons of the type generally referred to in the adhesive and sealant art as "highly aromatic modifying resins" or "highly aromatic tackifying resins". Specific examples of these highly aromatic hydrocarbon resins include normally solid polymers of α-methyl styrene such as poly(α-methyl styrene), and α-methyl styrene/vinyl toluene copolymer. The copolymers of α-methyl styrene and vinyl toluene are preferred.

Resin B or modifying resins which are compatible with the poly(conjugated diene) blocks of the linear or radial teleblock copolymers useful in this invention include normally solid modified and unmodified rosin and rosin esters of polyhydric alcohols, normally solid esters of polymerized rosin, polyterpene resins and resinous polyolefins derived from aliphatic and cycloaliphatic olefins. These polymers are nonaromatic.

Materials which are generally known as plasticizers in the rubber, adhesive and sealant art are useful as plasticizers in the inventive sealant formulations. These generally include: the well-known low molecular weight polyolefins, such as polybutenes; oils, including naphthenic, paraffinic or aromatic; methyl ester of rosin (low molecular weight liquid as opposed to the solid Resin B component); liquid phthalate esters, polymeric esters; chlorinated hydrocarbons; and the like, and mixtures thereof.

Fillers which are well known in the art are likewise useful as fillers in the present invention. Examples of such fillers include calcium carbonate, aluminum silicate, clay, talc, kaolin, barytes, mica, silica, etc., and mixtures thereof. Such fillers frequently reinforce the sealant.

Pigments are frequently employed in the formulations of the present invention for the aesthetic value of the sealant as well as for their reinforcing properties. Any pigment can be employed to impart whatever coloration is desired to the final sealant. Carbon black and titanium dioxide are well-known pigments.

It is usually desirable to include stabilizers in the inventive formulations. Such stabilizers include the well-known antioxidants and antiozonants, as well as ultraviolet and thermal stabilizers. Hindered phenols, substituted phosphites, phenolic phosphites, dialkyl thiodipropionates, nickel dialkyldithiocarbamates and the like and mixtures thereof are examples of types of stabilizers which are particularly beneficial in the present invention. Two particularly suitable stabilizers are Cyasorb 1084, a substituted thiophenol aminonickel complex, and NBC, nickel dibutylthiocarbamate. In addition, the poly(vinyl-substituted aromatic)-compatible component is inherently stable.

When application of the inventive sealant formulation as a solvent-release system is desired, saturated aliphatic, saturated cycloaliphatic or aromatic hydrocarbons are conveniently employed as solvent. Those common hydrocarbon solvents generally containing from 5 to 8 carbon atoms per molecule, such as pentane, hexane, heptane, octane, cyclohexane, benzene, toluene and the xylenes are especially useful. When solvents are used, most preferably, they are used in an amount within the range of 25 to 250 parts by weight per 100 parts by weight of the block copolymer.

It is also within the scope of this invention to apply the inventive sealant to a substrate as a hot-melt in which case no solvent is employed or as an emulsion in which case water and suitable emulsifiers are employed.

The sealant formulations of this invention are useful in sealing a wide variety of substrates. All common materials of construction, such as glass, aluminum, steel, concrete, brick, rock, ceramic, wood, etc., can be sealed by use of the inventive sealant.

The above-described ingredients of the inventive formulation are generally employed in amounts given in the following recipe.

| Recipe | | |
|---|---|---|
| | Parts by Weight | |
| Ingredient | Broad | Preferred |
| Teleblock copolymer | 100 | 100 |
| Resin A | 10–150 | 25–125 |
| Resin B | 10–150 | 25–125 |
| Plasticizer | 0–200 | 0–175 |
| Filler | 25–250 | 50–200 |
| Pigment | 0–40 | 5–30 |
| Solvent | 0–300 | 25–250 |
| Stabilizer | 0–10 | 0.5–5 |

EXAMPLE I

The following inventive and comparative runs were conducted on sealtants formulated according to the following recipe.

| Recipe | |
|---|---|
| Ingredient | Parts by Weight |
| Teleblock copolymer | 54.25 |
| Resin A[1] | Var. |
| Resin B | Var. |
| Methyl ester of rosin (plasticizer) | 21 |
| Dibutyl phthalate (plasticizer) | 21 |
| Calcium carbonate (filler) | 59.5 |
| Talc (filler) | 35 |
| Titanium dioxide (pigment) | 10 |
| Toluene (solvent) | 110 |
| Stabilizer[2] | 0–0.5 |

[1]Vinyl toluene/α-methyl styrene copolymer (Piccotex 120 from Pennsylvania Industrial Chemicals).
[2]15/1 weight ratio of 2-hydroxy-4-n-octoxybenzophenone and 2,2'-methylene-bis(4-methyl-6-t-butylphenol).

In Table I data are tabulated which were obtained on sealants formulated according to the above recipe.

TABLE I

| Run | 1 | 2 | 3 | 4 | 5 | 6 | 4 | 7 | 8 |
|---|---|---|---|---|---|---|---|---|---|
| Teleblock copolymer | D[1] | D | D | C[2] | C | C | C | C | C |
| Resin A, parts by weight | 54.25 | 36.1 | 0 | 54.25 | 36.1 | 0 | 54.25 | 36.1 | 0 |

TABLE I-continued

| Run | 1 | 2 | 3 | 4 | 5 | 6 | 4 | 7 | 8 |
|---|---|---|---|---|---|---|---|---|---|
| Resin B, parts by weight | 0 | 18.2[3] | 54.25[3] | 0 | 18.2[4] | 54.25[4] | 0 | 18.2[3] | 54.25[3] |
| Bulk Viscosity, cps[5] | 1.13MM | 236M | 232M | 728M | 148M | 168M | 728M | 128M | 100M |
| After drying at 85° C for 16 hours | | | | | | | | | |
| 50% Modulus, psi[6] | 65.5 | 66.5 | 48.5 | 96.3 | 53.5 | 105 | 96.3 | 75 | 58.5 |
| Tensile, psi[6] | 65.5 | 66.5 | 52.5 | 101.5 | 53.5 | 105 | 101.5 | 75 | 89.5 |
| Elongation, %[6] | 400 | 430 | >625 | 437.5 | 447 | 65 | 437.5 | 410 | >625 |
| Hardness, Shore A[7] | 45 | 45 | 37 | 62 | 35 | 60 | 62 | 45 | 40 |

[1]60/40 Butadiene/styrene radial teleblock copolymer coupled with silicon tetrachloride, weight average M.W.-150,000.
[2]60/40 Butadiene/styrene radial teleblock copolymer coupled with silicon tetrachloride, weight average M.W.-300,000.
[3]Pentaerythritol ester of hydrogenated rosin (Pentalyn H from Hercules).
[4]Polymerized mixed olefins (Wing-Tack 95 from Goodyear).
[5]Measured with Brookfield Viscometer at 25° C at 0.5 to 5 rpm with No. 7 spindle.
[6]ASTM D-888-56T. Measured after drying formulation at 85° C for 16 hours.
[7]ASTM D-2240-68. Measured after drying formulation at 85° C for 16 hours.

The data in Table I show that the bulk viscosities of the inventive formulations of Runs 2, 5 and 7 were much lower than those of comparative Runs 1 and 4 which contained Resin A as the only modifying resin.

EXAMPLE II

The following runs illustrate inventive formulations in both solvent release and hot-melt sealants. Prior art formulations were also prepared for comparative purposes.

The formulations for the runs of this example contained ingredients in amounts given in the following recipe.

| Ingredient | Recipe Parts by Weight Solvent-Release | Hot-Melt |
|---|---|---|
| Teleblock copolymer D[1] | 54.3 | 45 |
| Resin A[2] | Var | Var |
| Resin B | Var | Var |
| Methyl ester of rosin (plasticizer) | 21 | 0 |
| Dibutyl phthalate | 21 | 0 |
| Paraffinic oil | 0 | 77.1 |
| Talc | 35 | 0 |
| Calcium carbonate | 59.5 | 40.3 |
| Titanium dioxide | 10 | 13.4 |
| Zinc oxide | 0 | 13.4 |
| Antioxidant[3] | 0 | 2.5 |
| Ultraviolet absorber[4] | 2.5 | 2.25 |
| Toluene | 110 | 0 |

[1]See Footnote 1, Table I.
[2]Vinyl toluene/α-methyl styrene copolymer.
[3]4/1 Weight ratio of phenolic phosphite (Agerite Geltrol) and dilauryl thiodipropionate.
[4][2,2'-Thiobis(4-t-octylphenolato)]-n-butylamino nickel (II).

The data in Table II were obtained on formulations prepared according to the above recipe.

TABLE II

| Run | 9 | 10 | 11 | 12 | 13 | 14 | 15 | 16 | 17 | 18 |
|---|---|---|---|---|---|---|---|---|---|---|
| Sealant type | SR[1] | SR | SR | SR | SR | HM[2] | HM | HM | HM | HM |
| Resin A, parts by weight | 0 | 27.15 | 54.3 | 27.15 | 0 | 0 | 45 | 90 | 45 | 0 |
| Resin B, parts by weight | 54.3[3] | 27.15[3] | 0 | 27.15[4] | 54.3[4] | 90[3] | 45[3] | 0 | 45[4] | 90[4] |
| Bulk viscosity, cps | 234M[5] | 336M[5] | 1MM[5] | 376M[5] | 314M[5] | 8.8M[6] | 10.2M[6] | 48M[6] | 26.7M[6] | 2M[6] |
| 50% Modulus, psi | 11.25 | 13.5 | 85 | 60 | 70 | 8 | 18.5 | H[7] | 18.5 | S[9] |
| Tensile, psi | 14.5 | 28.3 | 97 | 60 | 70 | 41 | 85 | H | 93.5 | S |
| Elongation, % | 295 | 255 | 637.5 | 375 | 115 | >700 | >700 | H | 695 | S |
| Hardness, Shore A | 25 | 30 | 40 | 62 | 50 | 1 | 7 | H | 8 | S |
| Surface Condition | Slight Tack | Non-Tacky | Non-Tacky | Non-Tacky | Slight Tack | Very Tacky | Tacky | Non-Tacky | Slight Tack | Very Tacky |
| Canvas peel, ppiw[10] | 4.7 | 5.35 | 10.5 | 5.25 | 3.9 | 2.4 | 7 | H | N[8] | S |

[1]Solvent-release. See above recipe. Properties other than bulk viscosity measured on specimens dried at 85° C for 16 hours.
[2]Hot-melt. See above recipe.
[3]See Footnote 3, Table I.
[4]See Footnote 4, Table I.
[5]Measured with Brookfield viscometer at 25° C at 2.5 - 10 rpm with No. 7 spindle.
[6]Measured with Brookfield viscometer at 177° C at 10 - 20 rpm with No. 29 spindle.
[7]H = Too hard and brittle to evaluate.
[8]N = Would not seal canvas to aluminum.
[9]S = Very sticky with separation of rubber and oil phase, i.e., incompatible.
[10]Test specimens prepared and tested in accordance with Federal Specification TT-S-2306.

The data in Table II illustrate the utility of the inventive formulations for either solvent-release or hot-melt sealants. Inventive Runs 12 and 17 exhibited lower bulk viscosity than corresponding prior art Runs 11 and 16, respectively prepared using only Resin B, the polydiene compatible modifying resin. Inventive Runs 10, 12 and 15 gave sealants with less surface tack and higher canvas peel strength than corresponding prior art Runs 9, 13 and 14.

It will be observed that prior art hot-melt Runs 16 and 18 containing Resin A, poly(vinyl aromatic)-compatible resin, or Resin B, polydiene compatible resin, because of the particular choice of formulation ingredients and amounts thereof, resulted in products with rather limited utility as sealants judging from the nature of the products. Corresponding inventive hot-melt Run 17, while also appearing to have limited utility as a sealant based on the low canvas peel strength, did result in a pliable, homogeneous composition with lower bulk viscosity than comparative Run 16 and less surface tack than comparative Run 18.

EXAMPLE III

In Table III data on inventive runs were obtained on solvent release sealants also formulated according to the recipe of Example I which illustrate the scope of this invention with regard to various polydiene compatible modifying resins (Resin B) in combination with a vinyl toluene/α-methyl styrene copolymer as Resin A.

TABLE III

| Run No. | Resin A, Parts by Weight | Resin B, Parts by Weight | Bulk Visc., cps[10] | 50% Modulus, psi[9] | Tensile, psi[9] | Elongation, %[9] | Hardness, Shore A[9] |
|---|---|---|---|---|---|---|---|
| | | | | Teleblock Copolymer C | | | |
| 4 | 54.25 | 0 | 628M | 96.3 | 101.5 | 437.5 | 62 |
| 19 | 36.1 | 18.2[1] | 150M | 61.5 | 61.5 | 465 | 43 |
| 20 | 36.1 | 18.2[2] | 174M | 54 | 54 | 465 | 46 |
| 21 | 36.1 | 18.2[3] | 154M | 53 | 53 | 310 | 35 |
| 22 | 36.1 | 18.2[4] | 260M | 105.5 | 116 | 512.5 | 50 |
| 23 | 36.1 | 18.2[5] | 156M | 63.5 | 63.5 | 335 | 53 |
| | | | | Teleblock Copolymer D | | | |
| 1 | 54.25 | 0 | 1.13MM | 65.5 | 65.5 | 400 | 45 |
| 24 | 36.1 | 18.2[1] | 300M | 51 | 51 | 386.5 | 40 |
| 25 | 36.1 | 18.2[2] | 256M | 53 | 53 | 299.5 | 42 |
| 26 | 36.1 | 18.2[3] | 440M | 29 | 29 | 326.5 | 25 |
| 27 | 36.1 | 18.2[5] | 304M | 57.5 | 57.5 | 440 | 40 |
| 28 | 36.1 | 18.2[6] | 408M | 44.5 | 44.5 | 356.5 | 35 |
| | | | | Teleblock Copolymer E[8] | | | |
| 29 | 54.25 | 0 | 40.8M | 32 | 32 | 107.5 | 32 |
| 30 | 36.1 | 18.2[1] | 13.6M | 20.5 | 20.5 | 83 | 26 |
| 31 | 36.1 | 18.2[2] | 20M | 26 | 26 | 106 | 30 |
| 32 | 36.1 | 18.2[3] | 14M | 20 | 20 | 90 | 25 |
| 33 | 36.1 | 18.2[5] | 16.4M | 20 | 20 | 100 | 35 |
| 34 | 36.1 | 18.2[6] | 20.8M | 19.5 | 119 | 126 | 25 |
| 35 | 36.1 | 18.2[7] | 12.8M | 33.5 | 33.5 | 130 | 30 |

[1]Polymerized olefin (Super Sta Tac from Reichhold Chemicals).
[2]Polyterpene (Zonarez 7115 from Arizona Chemicals).
[3]Polyterpene (CRJ-683 from Schenectady Chemicals).
[4]Mixed esters of polymerized rosin (Polypale from Hercules).
[5]Hydrocarbon-based polar resin (Pexalyn A960 from Hercules).
[6]See footnote 4, Table I.
[7]See footnote 3, Table I.
[8]70/30 Butadiene/styrene radial teleblock copolymer coupled with silicon tetrachloride. Weight average M.W. - 150,000.
[9]Measured on specimens dried at 85° C for 16 hours.
[10]Measured with Brookfield Viscometer at 25° C at 0.5 to 5 rpm with No. 7 spindle.

The data in Table III show that the formulations of the three prior art Runs 1, 4 and 29 have higher bulk viscosities than the inventive runs containing, in addition to a poly(vinyl aromatic)-compatible resin (Resin A), a portion of various types of Resin B, a polydiene-compatible resin.

While this invention has been described in detail for the purpose of illustration, it is not to be construed as limited thereby, but is intended to cover all the changes and modifications within the spirit and scope thereof.

That which is claimed is:

1. A sealant composition which exhibits low surface tack after application comprising
    (1) a thermoplastic elastomer having the structure ABA or $(AB)_nY$, wherein A represents a block of a polymerized monovinyl-substituted aromatic compound, B represents a block of a polymerized conjugated diene, Y represents a residue of a polyfunctional coupling agent or a polyfunctional initiator, and n is an integer having a value of 2 to 4, said thermoplastic elastomer having a weight ratio of said monovinyl-substituted aromatic compound to said conjugated diene within the range of 50:50 to 5:95, said elastomer having the unsaturation normally associated with such polymers;
    (2) 10-15 parts by weight per 100 parts by weight of said thermoplastic elastomer of a poly(vinyl aromatic)-compatible modifying resin component which is an aromatic hydrocarbon;
    (3) 10-150 parts by weight per 100 parts by weight of said thermoplastic elastomer of a poly(conjugated diene)-compatible modifying resin component which is nonaromatic selected from normally solid modified and unmodified rosin and rosin esters of polyhydric alcohols, normally solid esters of polymerized rosin, polyterpene resins, and resinous polyolefins derived from aliphatic and cycloaliphatic olefins; and
    (4) 25-250 parts by weight per 100 parts by weight of said thermoplastic elastomer of a filler.

2. A composition according to claim 1 wherein said monovinyl substituted aromatic compound is styrene and said conjugated diene is 1,3butadiend.

3. A composition according to claim 2 wherein said poly(vinyl aromatic)-compatible modifying resin is present in an amount within the range of 25 to 125 parts by weight per 100 parts by weight of said thermoplastic elastomer, said poly(conjugated diene)-compatible modifying resin is present in an amount within the range of 25 to 125 parts by weight per 100 parts by weight of said thermoplastic elastomer, and said filler is present in an amount within the range of 50 to 200 parts by weight per 100 parts by weight of said thermoplastic elastomer.

4. A composition according to claim 3 wherein said poly(vinyl aromatic)-compatible modifying resin is a vinyl toluene/α-methyl styrene copolymer and said poly(conjugated diene)-compatible modifying resin is selected from pentaerythritol ester of hydrogenated rosin, polymerized mixed olefins, polymerized olefins, polyterpene, mixed esters of polymerized rosin, and hydrocarbon-based polar resins.

5. A composition according to claim 4 dissolved in a solvent.

6. A composition according to claim 5 wherein the A/B weight ratio is within the range of 40/60 to 15/85, and wherein said composition contains in addition a plasticizer and a stabilizer.

7. A composition according to claim 6 wherein said poly(conjugated diene)-compatible component is pentaerythritol ester of hydrogenated rosin.

8. A composition according to claim 7 wherein said thermoplastic elastomer is a radial teleblock copolymer coupled with silicon tetrachloride.

* * * * *

UNITED STATES PATENT AND TRADEMARK OFFICE
CERTIFICATE OF CORRECTION

PATENT NO. : 4,101,484

DATED : July 18, 1978

INVENTOR(S) : Richard C. Doss

It is certified that error appears in the above-identified patent and that said Letters Patent are hereby corrected as shown below:

Column 7, line 57, "10-15" should be --- 10-150 ---.
Column 8, line 36, "1,3butadiend" should be --- 1,3-butadiene ---.

Signed and Sealed this

Fifteenth Day of May 1979

[SEAL]

Attest:

RUTH C. MASON
*Attesting Officer*

DONALD W. BANNER
*Commissioner of Patents and Trademarks*